United States Patent
Chu et al.

(10) Patent No.: US 11,445,146 B2
(45) Date of Patent: Sep. 13, 2022

(54) VIDEO CONFERENCE TERMINAL AND VIDEO CONFERENCE SYSTEM

(71) Applicant: YEALINK (XIAMEN) NETWORK TECHNOLOGY CO., LTD., Fujian (CN)

(72) Inventors: Yingkun Chu, Fujian (CN); Yun Liao, Fujian (CN); Huirong Zhang, Fujian (CN)

(73) Assignee: YEALINK (XIAMEN) NETWORK TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 17/137,409

(22) Filed: Dec. 30, 2020

(65) Prior Publication Data

US 2021/0203883 A1    Jul. 1, 2021

(30) Foreign Application Priority Data

Dec. 30, 2019 (CN) .......................... 201911396330.6

(51) Int. Cl.
  *H04N 7/15*  (2006.01)
  *H04N 5/44*  (2011.01)
  *H04N 7/015*  (2006.01)

(52) U.S. Cl.
  CPC .................. *H04N 7/15* (2013.01); *H04N 5/44* (2013.01); *H04N 7/015* (2013.01)

(58) Field of Classification Search
  CPC .......... H04N 7/147; H04N 7/15; H04N 7/015; H04N 5/44
  USPC ........................................... 348/14.01–14.16
  See application file for complete search history.

(56) References Cited

U.S. PATENT DOCUMENTS

| | | | |
|---|---|---|---|
| 6,243,129 B1* | 6/2001 | Deierling | H04N 7/148 348/E9.037 |
| 2009/0239522 A1* | 9/2009 | Rek | H04L 65/1069 348/14.02 |
| 2018/0183851 A1* | 6/2018 | Fiedler | H04L 65/80 |
| 2019/0238940 A1* | 8/2019 | Rhoads | H04N 21/2665 |

FOREIGN PATENT DOCUMENTS

| | | | | |
|---|---|---|---|---|
| WO | WO-2018010129 A1 * | 1/2018 | ............. | G10L 15/26 |
| WO | WO-2018209561 A  * | 11/2018 | ......... | H04N 21/4788 |

OTHER PUBLICATIONS (EP 32489A1, r Aubin et al): Distribution Network, And Decoder Box Part Comprising Decoder To Decode Streams Received From Receiver Front-end.*

* cited by examiner

*Primary Examiner* — Melur Ramakrishnaiah

(57) ABSTRACT

The present disclosure relates to the field of communications technologies, and specifically, to a video conference terminal and a video conference system. The video conference terminal is provided with a content receiving module (101), an audio and video processing module (102), and a display module (103). To be specific, the video conference terminal (100) has a video conference function, so that the video conference terminal can serve as both an audio conference terminal and a video conference terminal, thereby enriching functions of the video conference terminal. Compared with a conventional conference terminal, the video conference terminal provided in embodiments of the present disclosure has easy deployment, low costs and high utilization as it can serve as a video conference terminal.

9 Claims, 2 Drawing Sheets

VIDEO CONFERENCE TERMINAL AND VIDEO CONFERENCE SYSTEM

CROSS-REFERENCE TO RELATED APPLICATIONS

The present application claims the benefit of Chinese Patent Application No. 201911396330.6 filed on Dec. 30, 2019, the contents of which are hereby incorporated by reference.

TECHNICAL FIELD

The present disclosure relates to the field of communications technologies, and in particular, to a video conference terminal and a video conference system.

BACKGROUND

Unlike traditional large and medium-sized conference rooms, some small and micro conference rooms are open and flexible. Such small and micro conference rooms are usually used for no specific purpose and can accommodate two to three persons, which is ideal for communication and collaboration models of small teams. Due to their high flexibility and small size, the small and micro conference rooms usually are not equipped with professional IT staff, nor are they equipped with expensive audio and video communication devices, display devices, and the like. Currently, desktop terminals applicable to small and micro conference rooms usually can be used only for making audio calls, and other external display devices are required for making video calls.

SUMMARY

To resolve a technical problem that an existing conference terminal needs to be connected to another external device when the existing conference terminal is used as a video conference terminal, the present disclosure provides a video conference terminal and a video conference system.

According to one aspect, an embodiment of the present disclosure provides a video conference terminal, including a processor and a display module. The processor is configured to execute the following program modules stored in a memory: a content receiving module, an audio and video processing module, and the display module.

The content receiving module is configured to receive video information sent by an external device, and send the received video information to the display module.

The audio and video processing module is configured to receive sent audio information or video information, and perform format adjustment on the received audio information or video information.

The display module is configured to display the video information sent by the content receiving module or the video information on which the audio and video processing module has performed format adjustment.

Optionally, the audio and video processing module is configured to perform noise reduction processing, transcoding processing, volume adjustment, resolution adjustment, and/or contrast adjustment on the received audio or video information.

Optionally, the video conference terminal further includes an external interface, and the external interface is configured to connect to the external device.

Optionally, the external interface includes a USB interface and an HDMI interface.

Optionally, the HDMI interface includes an HDMI IN interface and an HDMI OUT interface.

Optionally, the video conference terminal further includes an audio and video conversion interface, the audio and video conversion interface is configured to connect to a television area through a Type-C cable, and the television area includes a video camera and a display.

Optionally, the video conference terminal further includes a wireless transceiver module, and the wireless transceiver module is configured to connect to the video conference terminal and the external device in a wireless manner.

According to another aspect, an embodiment of the present disclosure provides a video conference system, and the video conference system includes the foregoing video conference terminal.

The technical solutions provided in the embodiments of the present disclosure have at least the following beneficial effects:

The video conference terminal is provided with the content receiving module, the audio and video processing module, and the display module. In this way, the video conference terminal has a video conference function, so that the video conference terminal can serve as both an audio conference terminal and a video conference terminal, thereby enriching functions of the video conference terminal. Compared with a conventional conference terminal, the video conference terminal provided in embodiments of the present disclosure has easy deployment, low costs and high utilization as it can serve as a video conference terminal, enabling a user to more conveniently have a conference.

BRIEF DESCRIPTION OF THE DRAWINGS

The accompanying drawings illustrate exemplary implementations of the disclosure, and are intended to explain the principles of the disclosure together with the description thereof. The accompanying drawings are included to provide a further understanding of the disclosure, and are included in and constitute part of the specification.

Figure 1:
FIG. 1 is a schematic diagram of a video conference terminal according to an embodiment of the present disclosure.

Reference numerals: 100-video conference terminal; 101-content receiving module; 102-audio and video processing module; and 103-display module.

DETAILED DESCRIPTION

The present disclosure is described in further detail below with reference to the accompanying drawings and implementations. It should be understood that the specific implementations described herein are merely intended to explain related content, rather than to limit the present disclosure. It should also be noted that, for convenience of description, only the parts related to the present disclosure are shown in the accompany drawings.

It should be noted that, in case of no conflict, the implementations in the present disclosure and the features in the implementations may be combined with each other. The present disclosure is described in detail below with reference to the accompanying drawings and implementations.

A first embodiment of the present disclosure provides a video conference terminal, and the video conference terminal is mainly applied to a small and micro conference room. As shown in FIG. 1, the video conference terminal 100 includes a content receiving module 101, an audio and video processing module 102, and a display module 103.

The content receiving module 101 is configured to receive video information sent by an external device, and send the received video information to the display module 103. For example, when a user needs to share an auxiliary stream, content (that is, video information) displayed on another external device may be transferred to the content receiving module 101. The content receiving module 101 may perform decoding or noise reduction processing on the received video information, and then send the processed video information to the display module 103 to display the content displayed on the another external device. A person skilled in the art may understand that, the video information described in the present disclosure actually includes video information and audio information corresponding to the video information.

The audio and video processing module 102 is configured to receive audio information or video information, and transmit the received audio or video information to each conference participant terminal. The audio or video information received by the audio and video processing module 102 may be audio or video information sent by a counterpart terminal, or may be audio or video information sent by the external device. In a possible implementation, the audio and video processing module 102 may transmit the received audio or video information to each conference participant terminal by using a session initiation protocol (SIP). In addition, the audio and video processing module 102 is further configured to perform format adjustment on the received audio or video information. For example, the audio and video processing module 102 performs noise reduction processing on the audio or video information, adjusts a volume of the audio or video information, adjusts resolution and contrast of the video information, and transcodes the audio or video information. The counterpart terminal is a conference terminal that is not present during an audio and video conference. The audio and video processing module 102 may receive, through a wired or wireless communication network, the audio information or video information sent by the counterpart terminal.

The display module 103 is configured to display the video information sent by the content receiving module 101 or a video whose format has been adjusted by the audio and video processing module 102. To be specific, the video conference terminal 100 can serve as both an audio conference terminal and a video conference terminal. The display module 103 may be a light emitting diode (LED) display screen, an organic light-emitting diode (OLED) display screen, or the like, and the display screen can support a touch function, that is, a user can control the display screen in a touch manner, or control the video conference terminal 100 through the display screen in a touch manner. In a possible implementation, after the video conference terminal 100 is powered on, a staff member can control the video conference terminal 100 to enter an audio conference mode or a video conference mode through the display module 103.

In a possible implementation, the video conference terminal 100 further includes an external interface, and the external interface is configured to connect to the external device. When a user needs to expand a function of the video conference terminal 100, the user can connect the video conference terminal 100 to the external device through the external interface. For example, when the user needs to make a video call by collecting video information through a video camera, the user can connect the video conference terminal 100 to the video camera through the external interface. In this case, the video camera is configured to collect the video information, and send the collected video information to the audio and video processing module 102, so that the audio and video processing module performs format adjustment on the video information collected by the video camera. In such an implementation, the external video camera can be freely plugged in or out, and the user can freely select a location of installing the video camera, to obtain a wider framing range. Alternatively, when the user needs to share an auxiliary stream, that is, content displayed on another display device needs to be shared during a video conference call, or content displayed on the display screen of the video conference terminal 100 needs to be displayed on another display device, the video conference terminal 100 may be connected to a display device such as a television, a computer, or a projector through the external interface. In addition, the external interface may alternatively be connected to an audio expansion device such as a stereo or a microphone, to provide a better audio and visual effect for a user.

Figure 2:
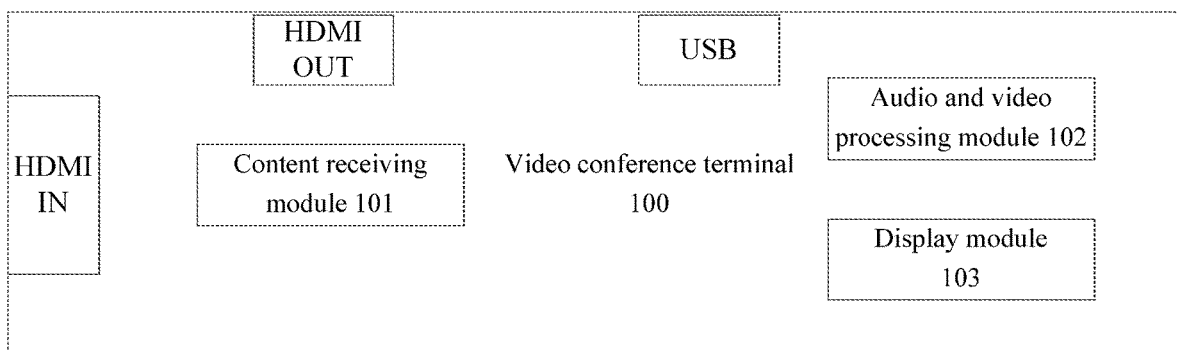
FIG. 2 is a schematic diagram of another video conference terminal according to an embodiment of the present disclosure.
Figure 3:
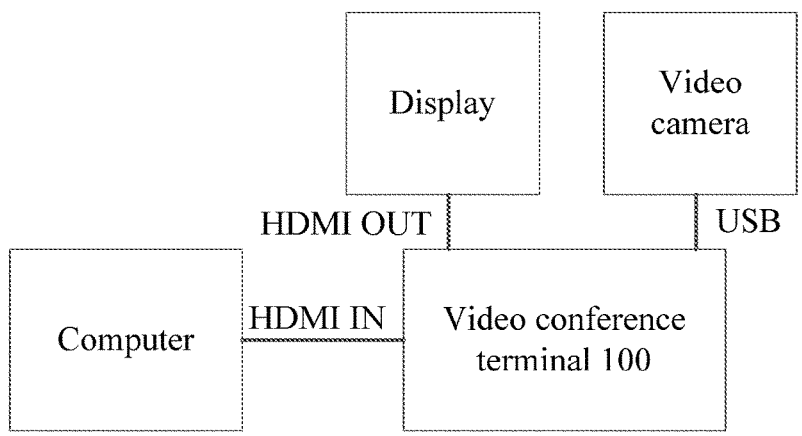
FIG. 3 is a schematic diagram showing that a video conference terminal is connected to an external device according to an embodiment of the present disclosure.

In a possible implementation, as shown in FIG. 2 and FIG. 3, the external interface includes a USB interface and an HDMI interface. To be specific, different types of external devices may be separately connected to the video conference terminal 100 through the USB interface and the HDMI interface. The HDMI interface may include an HDMI IN interface and an HDMI OUT interface, to be used to connect to different types of external devices. For example, an external USB video camera may be connected to the video conference terminal 100 through the USB interface, to provide an input of video information. A computer may be connected to the video conference terminal 100 through the HDMI IN interface, to share content displayed on the computer to the video conference terminal 100. An external display may be connected to the video conference terminal 100 through the HDMI OUT interface, to share content displayed on the video conference terminal 100 to the external display for display, or display, on the external display, content that is displayed on the computer and shared by the video conference terminal 100. In a possible implementation, after the video conference terminal 100 is controlled to enter the video conference mode, if video information needs to be collected by using the external video camera, the video conference terminal 100 may be connected to the video camera through the external interface. The video information collected by the video camera may be directly displayed on the display screen of the video conference terminal 100, and may be sent to the counterpart terminal through a wireless or wired network.

In a possible implementation, if an auxiliary stream needs to be shared, the video conference terminal 100 may be connected to a display device such as a television or a computer through the external interface, to share video content displayed on the display device such as the television or the computer to the display screen of the video conference terminal 100. If video information displayed on the display screen of the video conference terminal 100 needs to be shared to another external display, the video conference terminal 100 may be connected to the external display through the external interface, to share the video information displayed on the display screen of the video conference terminal 100 to the external display. In this case, the video information displayed on the display screen of the video conference terminal 100 may include only video information displayed on an original display screen, or may include only video information shared by the external display device to the display screen, or may include both the video information displayed on the original display screen and the video information shared by the external display device to the display screen.

Figure 4:
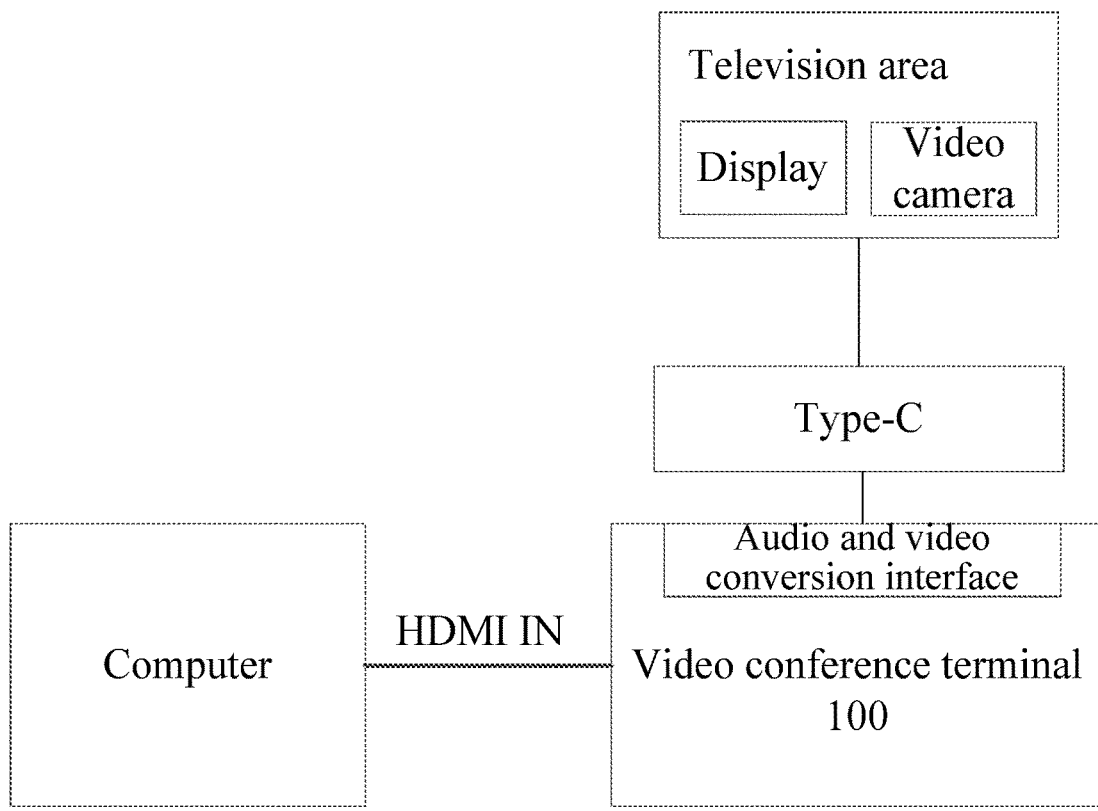
FIG. 4 is a schematic diagram showing that a video conference terminal is connected to a television area according to an embodiment of the present disclosure.
Figure 5:
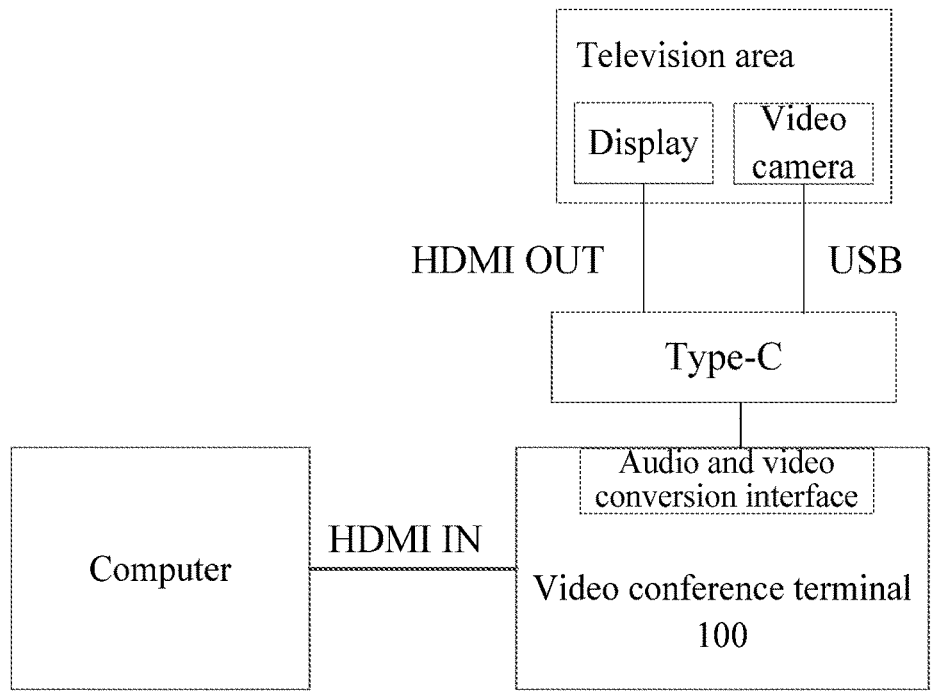
FIG. 5 is another schematic diagram showing that a video conference terminal is connected to a television area according to an embodiment of the present disclosure.

In a possible implementation, the video conference terminal 100 may further include an audio and video conversion interface. The audio and video conversion interface is configured to connect to a television area through a Type-C cable. In other words, the video conference terminal 100 can be connected to the television area through only one cable. The television area includes a video camera configured to capture a local video and an external device such as a display used for extended display. In a possible implementation, as shown in FIG. 4, the television area may include only one external device, and the external device may include both a display and a video camera (or a camera). In this case, the external device can be connected to through only one Type-C cable. Alternatively, as shown in FIG. 5, the television area may include a plurality of devices, such as a display and a video camera. In this case, the video conference terminal 100 may be connected to only one Type-C cable, and then connected to the display and the video camera in the television area through the Type-C cable via the HDMI OUT interface or the USB interface.

In a possible implementation, the video conference terminal 100 may further include a wireless transceiver module. The wireless transceiver module is configured to connect to the video conference terminal 100 and the external device in a wireless manner. To be specific, the wireless transceiver module is configured to receive a wireless signal sent by the external device and send a wireless signal of the video conference terminal 100 to the external device. It should be noted that, the wireless signal herein includes audio information and video information that are used for an audio and video conference.

In such an implementation, the video conference terminal 100 may be connected to another external device (such as a video camera, a computer, or an external display) by using only the wireless transceiver module. Alternatively, the video conference terminal 100 may be connected to another external device by using the wireless transceiver module and either or both of the external interface and the audio and video conversion interface.

In addition, the video conference terminal 100 further includes a speaker and a power supply interface, to provide audio output and power supply support.

In another preferred embodiment, the video conference terminal provided in the foregoing embodiment includes a processor and a display module. The processor is configured to execute the following program modules stored in a memory: a content receiving module and an audio and video processing module. The content receiving module is configured to receive video information sent by an external device, and send the received video information to the display module. The audio and video processing module is configured to receive sent audio information or video information, and perform format adjustment on the received audio information or video information. The display module is configured to display the video information sent by the content receiving module or the video information on which the audio and video processing module has performed format adjustment.

In this embodiment, local video information may be collected by the external video camera, and displayed by the display module in the video conference terminal 100. To be specific, the video conference terminal 100 has a video conference function, so that the video conference terminal 100 can serve as both an audio conference terminal and a video conference terminal, thereby enriching functions of the video conference terminal 100. In addition, the video conference terminal 100 is provided with an external interface, an audio and video conversion interface, and/or a wireless transceiver module, and may be connected to all external devices in a conventional form of only two cables (a USB interface+an HDMI interface), or may be connected to the television area through only one Type-C cable, or may be connected to the external device through only the wireless transceiver module, or may be connected to the external device by using a USB interface, an HDMI interface, a Type-C cable, and the wireless transceiver module. This is highly extensible, connectable and flexible, and can achieve better collaboration and communication efficiency. Compared with a conventional conference terminal, the video conference terminal 100 provided in this embodiment has easy deployment, low costs and high utilization as it can serve as a video conference terminal. When the video conference terminal 100 is provided with an audio and video conversion interface or a wireless transceiver module, wiring deployment can be simplified, some external interfaces can be omitted, the appearance of the video conference terminal 100 can be kept simple, and ports of the video conference terminal 100 to be occupied can be reduced.

A second embodiment of the present disclosure provides a video conference system. The video conference system includes the video conference terminal provided in the foregoing embodiment.

In the description of this specification, the description with reference to the terms such as "one embodiment/implementation", "some embodiments/implementations", "an example", "a specific example", or "some examples" means that the specific features, structures, materials, or characteristics described with reference to the embodiment/implementation or example are included in at least one embodiment/implementation or example of this application. In this specification, the illustrative expressions of the above terms do not necessarily refer to a same embodiment/implementation or example. Moreover, the specific features, structures, materials, or characteristics described may be combined in any suitable manner in any one or more embodiments/implementations or examples. In addition, a person skilled in the art may combine different embodiments/implementations or examples described in this specification and features of the different embodiments/implementations or examples without mutual contradiction.

Moreover, the terms "first" and "second" are used only for the purpose of description and cannot be understood as indicating or implying relative importance or implicitly indicating the number of technical features indicated. Therefore, features defined by "first" and "second" may explicitly or implicitly include at least one of the features. In the description of this application, "a plurality of" means at least two, for example, two or three, unless otherwise clearly and specifically limited.

A person skilled in the art should understand that the foregoing implementations are merely intended to describe the present disclosure clearly, but not to limit the scope of the present disclosure. A person skilled in the art may make other changes or modifications based on the foregoing disclosure, and these changes or modifications still fall within the scope of the present disclosure.

What is claimed is:

1. A video conference terminal, comprising a processor and a display module (103), wherein the processor is configured to execute the following program modules stored in a memory: a content receiving module (101) and an audio and video processing module (102), wherein
the content receiving module (101) is configured to receive video information sent by an external device, and send the received video information to the display module (103); and
the audio and video processing module (102) is configured to receive audio information or video information, and perform format adjustment on the received audio information or video information;
the display module (103) is configured to display the video information sent by the content receiving module (101) or the video information on which the audio and video processing module (102) has performed format adjustment; and
wherein the video conference terminal further comprises an audio and video conversion interface, the audio and video conversion interface is configured to connect to a television area through a Type-C cable, and the television area comprises a video camera and a display.

2. The video conference terminal according to claim 1, wherein the audio and video processing module (102) is configured to perform noise reduction processing, transcoding processing, volume adjustment, resolution adjustment, and/or contrast adjustment on the received audio or video information.

3. The video conference terminal according to claim 1, wherein the video conference terminal further comprises an external interface, and the external interface is configured to connect to the external device.

4. The video conference terminal according to claim 3, wherein the external interface comprises a USB interface and an HDMI interface.

5. The video conference terminal according to claim 4, wherein the HDMI interface comprises an HDMI IN interface and an HDMI OUT interface.

6. A video conference system, comprising the video conference terminal according to claim 3.

7. The video conference terminal according to claim 1, wherein the video conference terminal further comprises a wireless transceiver module, and the wireless transceiver module is configured to connect to the video conference terminal and the external device in a wireless manner.

8. A video conference system, comprising the video conference terminal according to claim 7.

9. A video conference system, comprising the video conference terminal according to claim 1.

* * * * *